(12) United States Patent
Stoakley et al.

(10) Patent No.: US 7,694,229 B2
(45) Date of Patent: Apr. 6, 2010

(54) SYSTEM AND THEME FILE FORMAT FOR CREATING VISUAL STYLES

(75) Inventors: Richard W. Stoakley, Seattle, WA (US); Gregory W. Raiz, Bellevue, WA (US); Roland L. Fernandez, Woodinville, WA (US); Aaron B. Tinling, Seattle, WA (US); Christopher Evans, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1348 days.

(21) Appl. No.: 10/839,908

(22) Filed: May 6, 2004

(65) Prior Publication Data

US 2004/0201632 A1  Oct. 14, 2004

Related U.S. Application Data

(63) Continuation of application No. 09/825,488, filed on Apr. 3, 2001, now Pat. No. 6,753,885.

(60) Provisional application No. 60/195,594, filed on Apr. 6, 2000.

(51) Int. Cl.
G06F 3/00 (2006.01)

(52) U.S. Cl. .................. 715/762; 715/764; 715/765; 715/243; 715/744

(58) Field of Classification Search ......... 715/762–765, 715/234, 235, 236, 744, 243, 743; 707/100, 707/102
See application file for complete search history.

(56) References Cited

U.S. PATENT DOCUMENTS

| 5,301,301 A | 4/1994 | Kodosky et al. |
| 5,301,336 A | 4/1994 | Kodosky et al. |
| 5,603,034 A * | 2/1997 | Swanson ............... 717/111 |
| 5,838,317 A * | 11/1998 | Bolnick et al. ........... 715/764 |
| 5,862,379 A | 1/1999 | Rubin et al. |

(Continued)

FOREIGN PATENT DOCUMENTS

EP    0442676 A2   8/1991

(Continued)

OTHER PUBLICATIONS

Philip T. Cox, "Picture The Future," Object Magazine, pp. 46-49, Jul.-Aug. 1993.

(Continued)

*Primary Examiner*—Tadeese Hailu
(74) *Attorney, Agent, or Firm*—Shook, Hardy & Bacon L.L.P.

(57) ABSTRACT

A method of specifying a visual style for a set of graphical components is provided for use on a computer system having a graphical operating environment. The method includes providing a schema file of available graphical components for which a visual style can be created. In the schema file, each component is defined by a unique class name. The method further includes selecting graphical components from the schema file that are desired to have a defined visual style. Properties are then assigned to these selected components according to the desired visual style, and pairs of selected graphical components and corresponding assigned properties for the defined visual style together are grouped together in a class data file that defines the overall appearance for the defined visual style.

19 Claims, 7 Drawing Sheets

U.S. PATENT DOCUMENTS

| | | | |
|---|---|---|---|
| 5,872,973 A | | 2/1999 | Mitchell et al. |
| 5,893,107 A * | | 4/1999 | Chan et al. ............... 707/103 R |
| 5,956,506 A | | 9/1999 | Cobb et al. |
| 5,959,624 A * | | 9/1999 | Johnston et al. ............. 715/746 |
| 6,091,411 A * | | 7/2000 | Straub et al. ................ 715/747 |
| 6,104,391 A * | | 8/2000 | Johnston et al. ............. 715/745 |
| 6,188,399 B1 * | | 2/2001 | Voas et al. .................. 715/723 |
| 6,307,574 B1 * | | 10/2001 | Ashe et al. .................. 715/765 |
| 6,353,451 B1 | | 3/2002 | Teibel |
| 6,392,671 B1 * | | 5/2002 | Glaser ........................ 715/765 |
| 6,466,228 B1 * | | 10/2002 | Ulrich et al. ................ 345/619 |
| 6,598,219 B1 | | 7/2003 | Lau |
| 6,613,099 B2 * | | 9/2003 | Crim .......................... 715/210 |
| 6,664,981 B2 * | | 12/2003 | Ashe et al. .................. 715/765 |
| 6,710,782 B2 * | | 3/2004 | Ruff et al. ................... 345/619 |
| 6,909,437 B2 * | | 6/2005 | Ruff et al. ................... 345/619 |
| 7,017,162 B2 | | 3/2006 | Smith et al. |
| 2001/0045961 A1 | | 11/2001 | Stoakley et al. |
| 2002/0054046 A1 | | 5/2002 | Evans et al. |
| 2003/0028685 A1 | | 2/2003 | Smith et al. |
| 2003/0093419 A1 | | 5/2003 | Bangalore et al. |
| 2003/0101439 A1 | | 5/2003 | Desoli et al. |
| 2003/0167277 A1 | | 9/2003 | Hejlsberg et al. |
| 2003/0167355 A1 | | 9/2003 | Smith et al. |
| 2003/0167356 A1 | | 9/2003 | Smith et al. |
| 2003/0172196 A1 | | 9/2003 | Hejlsberg et al. |
| 2003/0177282 A1 | | 9/2003 | Hejlsberg et al. |
| 2003/0184590 A1 | | 10/2003 | Will |
| 2003/0200254 A1 | | 10/2003 | Wei |

FOREIGN PATENT DOCUMENTS

| | | | |
|---|---|---|---|
| EP | 0371941 B1 | 3/1996 | |
| EP | 0860773 A1 | 8/1998 | |
| EP | 1077404 A2 | 2/2001 | |
| EP | 1143334 A2 | 10/2001 | |
| EP | 1283465 A2 | 2/2003 | |
| EP | 1536327 A2 | 6/2005 | |
| EP | 1536451 A1 | 6/2005 | |
| KR | 20010076789 A | 4/2001 | |
| KR | 20020040588 A | 5/2002 | |
| RU | 2157000 C2 | 9/2000 | |
| RU | 2212118 C2 | 9/2003 | |
| WO | WO03065173 A2 | 7/2003 | |

OTHER PUBLICATIONS

Hambleton D. Lord, "Visual Programming for Visual Applications: A New Look for Computing," Object Magazine, pp. 37-40, Jul.-Aug. 1994.

Marsan, Anne L. and Debasish, Dutta, "Computational Techniques for Automatically Tiling and Skinning Branched Objects," Computers & Graphics, 23 (1999), pp. 111-126.

Lakshminarayanan, "The.NET Schema Object Model", at <<http://www.sml.com/1pt/a/1074 (1 to 17) Oct. 21, 2007 7:11:45 AM>>,O'Reilly Media, Inc., 1998-2006, pp. 17.

Powers, et al., Visual Basic Programmer's Guide to the .NET Framework Class Library, Jan. 2, 2002, Sams, pp. 1-9.

"API Documentation", web page: http://web.archives.org/web/20030207054709/java.sun.com/apis.html, Dec. 11, 2002, printed Sep. 16, 2004, 2 pgs.

"Java 2 Platform, Standard Edition (J2SE)", web page: http://web.archives.org/web/20030206212856/http://java.sun.com/js2e, printed Sep. 16, 2004, 3 pgs.

"Java 2 Platform, Standard Edition, v 1.4.1 API Specification", web page: http://web.archives.org/web/20040210134055/http://java.sun.com/j2se/1.4.1/docs/api/overview-summary.html, 2002, printed Sep. 16, 2004, 8 pgs.

Java 2 Platform, Standard Edition (J2SE):, web page: http://web.archives.org/web/20030207125037/java.sun.com/docs, Sep. 10, 2004, 3 pgs.

"Java 2SDK, Standard Edition Documentation", Version 1.4.1, web page: http://web.archives.org/web/20030206231542/java.sun.com/j2se/1.4.1/docs/index.html, 2002, printed Sep. 16, 2004, 5 pgs.

Lee, "The Java Class Libraries" Second Edition, vol. 2, Addison Wesley, Oct. 1997, pp. 303-395.

"Programmer's Guide to the Java 2D API", Java 2 SDK, Standard Edition, 1.4 version, Apr. 24, 2001, web site: http://web.archives.org/web/20030405075635/http://java.sun.com/j2se/1.4.2/docs/guide/2d/spec/i2d-bo . . . , printed Sep. 16, 2004, 5 pgs.

White et al., JDBC API Tutorial and Reference:, Second Edition, Addison Wesley, 1999, pp. 99-103.

* cited by examiner

SYSTEM AND THEME FILE FORMAT FOR CREATING VISUAL STYLES

CROSS-REFERENCE TO RELATED APPLICATION

This application is a continuation of U.S. application Ser. No. 09/825,488 filed Apr. 3, 2001, now U.S. Pat. No. 6,753,885, entitled SYSTEM AND THEME FILE FORMAT FOR CREATING VISUAL STYLES, which claims the benefit of U.S. Provisional Application No. 60/195,594, filed Apr. 6, 2000.

STATEMENT REGARDING FEDERALLY SPONSORED RESEARCH OR DEVELOPMENT

Not applicable.

TECHNICAL FIELD

The present invention relates to a computer system and, more particularly, to a method, system and file format that facilitates creating and changing the visual style of displayed graphical components, such as controls.

BACKGROUND OF THE INVENTION

Computer users in both the business and home environment have become accustomed to using a computer with a graphical operating system. For example, many users operate computers having a Microsoft Corporation "WINDOWS" operating system thereon. Certain components of these graphical operating systems are known as "controls." For example, a control may be an "OK" button, which is generally a rectangular button with "OK" written in it. By moving the cursor over the button and clicking on the mouse, a known operation will begin that is associated with the control. Many other controls exist, with examples including scroll bars, dialog boxes and sliders. Beyond controls, the graphical operating systems also draw, or render, other graphical components as needed on the display of the computer, such as the window frame, the minimize box and the close box, which may collectively be called "non-client" components.

There are two general kinds of controls in WINDOWS: standard and custom. Standard controls are provided by the operating system. The code to create, draw and operate standard controls is contained in the common control library (DLL), or in USER.dll, both of which are standard libraries provided as a part of WINDOWS. Custom controls are all other controls. Custom controls may be created by the manufacturer of the operating system or by third parties. The code for custom controls is contained in a corresponding separate library (DLL) or within an application.

Currently, when a graphical user interface component, such as a control, is used by an application, the application requests that an instance of the component be created. Following this, the operating system transmits a generic message to the component, instructing the component to render itself. The application plays a role in routing the message from the main window to the targeted control, but the control code performs the drawing. The application uses application programming interfaces (API's) to create and interact with the control. An API serves as a software interface to be used by other programs, much as the keypad serves as an interface to a calculator. An API is a fundamental concept of high-level programming. In high-level programming, a program often does not execute tasks by itself. Instead, the program asks some other program to execute these tasks. For example, programs frequently delegate various tasks to the underlying operating system. Continuing with the above example, an application delegates the rendering of a control to the control's code.

In the existing environment, when a generic rendering message is received by a control to draw itself, the control will draw itself using its own drawing software code. In this prior art environment, the control knows what it is supposed to look like, how it is supposed to behave, and can effectuate such a display on the user interface of the computer. Thus, the application may delegate all aspects of visual rendering to the controls, avoiding the need to contain software code to support the visual rendering of the control within the host application itself.

By utilizing the standard controls defined and rendered by the operating system, all controls will have the same appearance, regardless of the application. Users of graphical operating systems can change only a limited number of characteristics of the controls. In the "WINDOWS" operating system, a user can change the color scheme used to display the various controls and components on the monitor. The user can also select one of a number of fonts to be used by the controls and components. The user can also specify nonclient sizes that will control the sizing of the non-client areas. Thus, the colors, fonts and sizes of the controls and components may be changed. However, the basic appearance of the controls and components is dictated by the rendering software code within the control library containing the particular graphical component or control. In the prior art environment, to change the appearance of the controls or graphical components, the rendering software code must be altered. For example, if it is desired to change the appearance of the "OK" button, the rendering software code within the operating system DLL file containing the button control must be altered and the DLL file reconstructed at the binary level. If it was desired to render the button as an oval, the software code would have to be changed accordingly. Such an approach makes it difficult, if not impossible, for a computer user and for software manufacturers, to easily alter the appearance of the controls and graphical components.

In order to enhance the user experience of the computer, it would be desirable for the user to have the ability to change the overall "look and feel" of the graphical display by changing the overall visual appearance or "theme" of the various graphical components. In other words, it would be desirable if the user could change not only the color and font of the graphical components appearing on the monitor, but to change the appearance of those graphical components as well. For example, it would be desirable to be able to alter and direct the layout of the parts of a control, and to define the shape of a control or its parts. It would also be desirable to control all aspects of how a control or its parts are drawn. Because the controls and graphical components existing within the DLL file in the prior art environment are "hard coded" with their own rendering software code, it is difficult and cumbersome to change the appearance of all of the controls and components. To do so would require recoding each of the controls to achieve the desired appearance. If multiple visual styles were required, they would each have to be predefined and each "hard coded" into every control.

Using the current approach, if a user interface designer desires to have a new "look" for a set of graphical components, the designer must communicate this desire to a programmer. The programmer will then attempt to appropriately code the components to achieve the look desired by the designer. The designer will then review the look and communicate any needed changes to the programmer. This process continues, often with multiple iterations, until the designer is satisfied with the look achieved. It can be seen that the above process is time-consuming and is limited by the communication between the designer and the programmer. It would be desirable to allow the designer to be able to perform the tasks necessary to achieve a specific look and to be able to revise the look achieved until the designer is satisfied. This would eliminate the revision time between the designer and the programmer and would give the designer more flexibility in the look achieved.

Certain prior approaches exist that attempt to address the above situation. However, these solutions do not allow all of the controls and graphical components of the entire system to be changed. Instead, the prior art approaches address only limited portions of the set of displayed components. This allows the appearance of some controls and graphical components to be altered, leaving the remainder unaltered. Further, the prior art approaches may suffer from poor performance and may lack the desired level of stability.

Accordingly, there is a need for an effective system, method and file format that allows a designer to efficiently create a visual style for a set of controls and graphical components that addresses the above drawbacks and deficiencies. Such a system and file format should allow a programmer or custom control author the flexibility to create new options for the controls and components, such that the designer has additional options. Adding a new control type or a new custom property does not require a change to the theme manager, including the parser, loader and renderer code. A need also exists for a system and method that allows options within a "theme" or visual style, such as an easy method for creating a different size theme or a different color theme. A need also exists for a method and system that provides a file format for a visual style that defines components in a hierarchical fashion, making the file easier to maintain.

SUMMARY OF THE INVENTION

Generally described, a method of creating a visual style for a set of graphical components is provided for use on a computer system having a graphical operating environment. The method includes providing a schema file that contains the available graphical components or controls for which a visual style can be created, along with their associated theming properties. Each component or control within the schema file is defined by a unique class name. The method further includes selecting controls from the schema file and assigning desired properties to the selected controls. The method further includes providing a second schema file which is an extension of the first schema file. This allows the schema file to be extensible so that authors of custom controls can easily extend the list of themed controls to include additional custom controls. The theme author can use the standard theme properties as well as defining custom properties.

The method includes providing another file, called a "class data" file, which specifies the set of drawing, layout and measuring properties and values that are to be applied to each control or graphical component. In one embodiment, the properties are defined in a hierarchical fashion that can specify property value pairs on the global, control, part and state levels.

The method further includes providing yet another file, called a "package" file. The package file describes a set of related class data files that comprise a logical theme. This file includes documentation and user interface properties and values that describe the logical theme and each class data file within it. The package file also associates each class data file with a named "Color Scheme" and "Size". In addition, it provides for the automatic generation of new color and size combinations at runtime, based on color and size transformation properties.

A computer readable medium is also provided that has stored thereon a data structure. The data structure is used to store a set of defined visual characteristics for a graphical component. The data structure includes a class control name object representative of one of a number of class control names defined within a schema file and a class control property object that defines a desired property for the class control name object. The class control property object is selected from one of a number of defined properties corresponding to the class control name within the schema file. The data structure can also include a part name object representative of one of a number of part names defined within the schema file corresponding to the class control name, and a part property object that defines a desired property for the part name object. The part property object is selected from one of a number of defined properties corresponding to the part name within the schema file. The data structure can also include a state name object representative of one of a number of state names defined within the schema file corresponding to the part name object, and a state property object that defines a desired property for the state name object. The state property object is selected from one of a number of defined properties corresponding to the state name within the schema file.

Additional advantages and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 7:
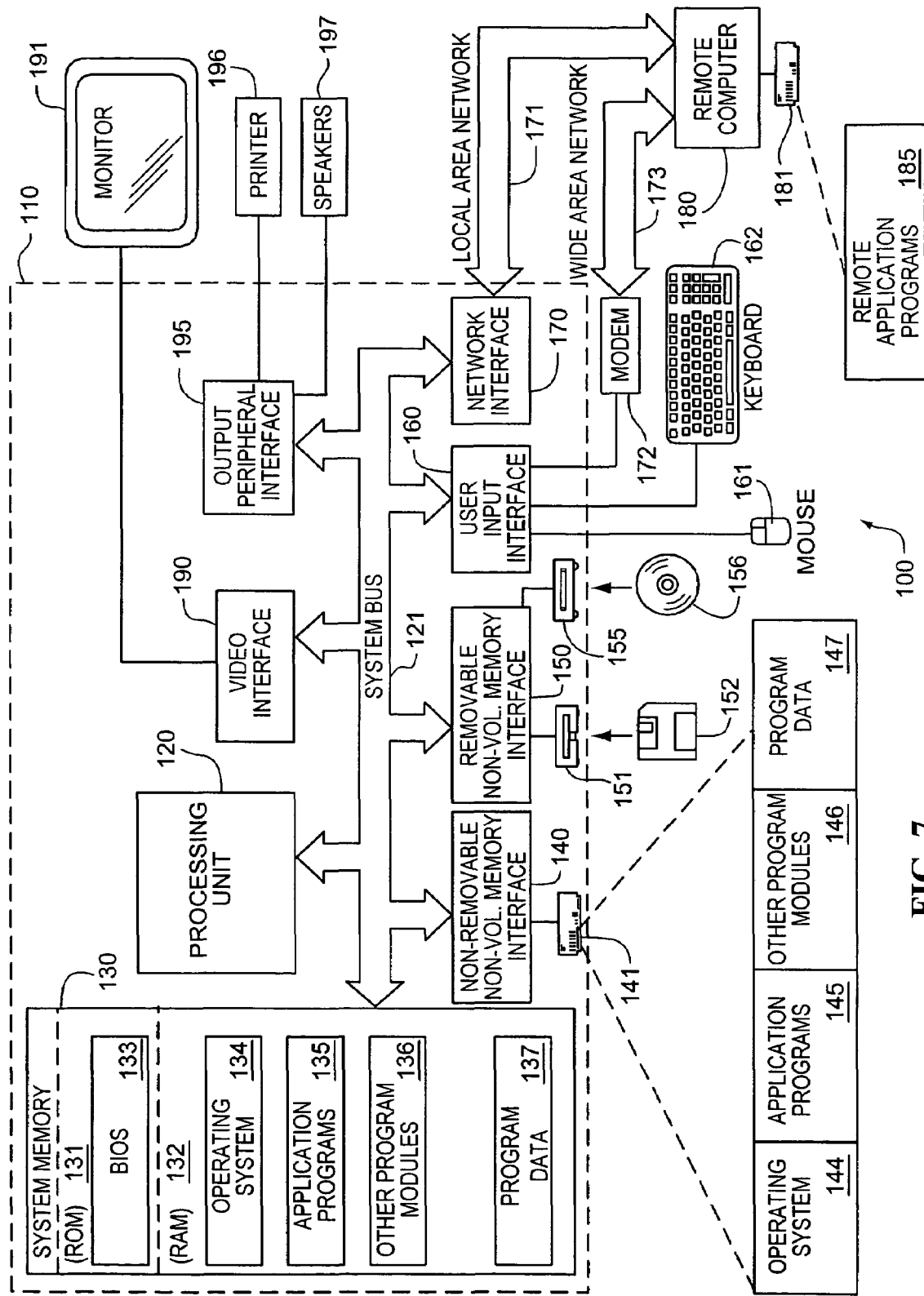
FIG. 7 is a block diagram of a suitable computing system environment for use in implementing the present invention.

The present invention provides a system, method and file format that facilitates creating and changing the visual style of displayed graphical components, such as controls, within a graphical operating environment. FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 5:
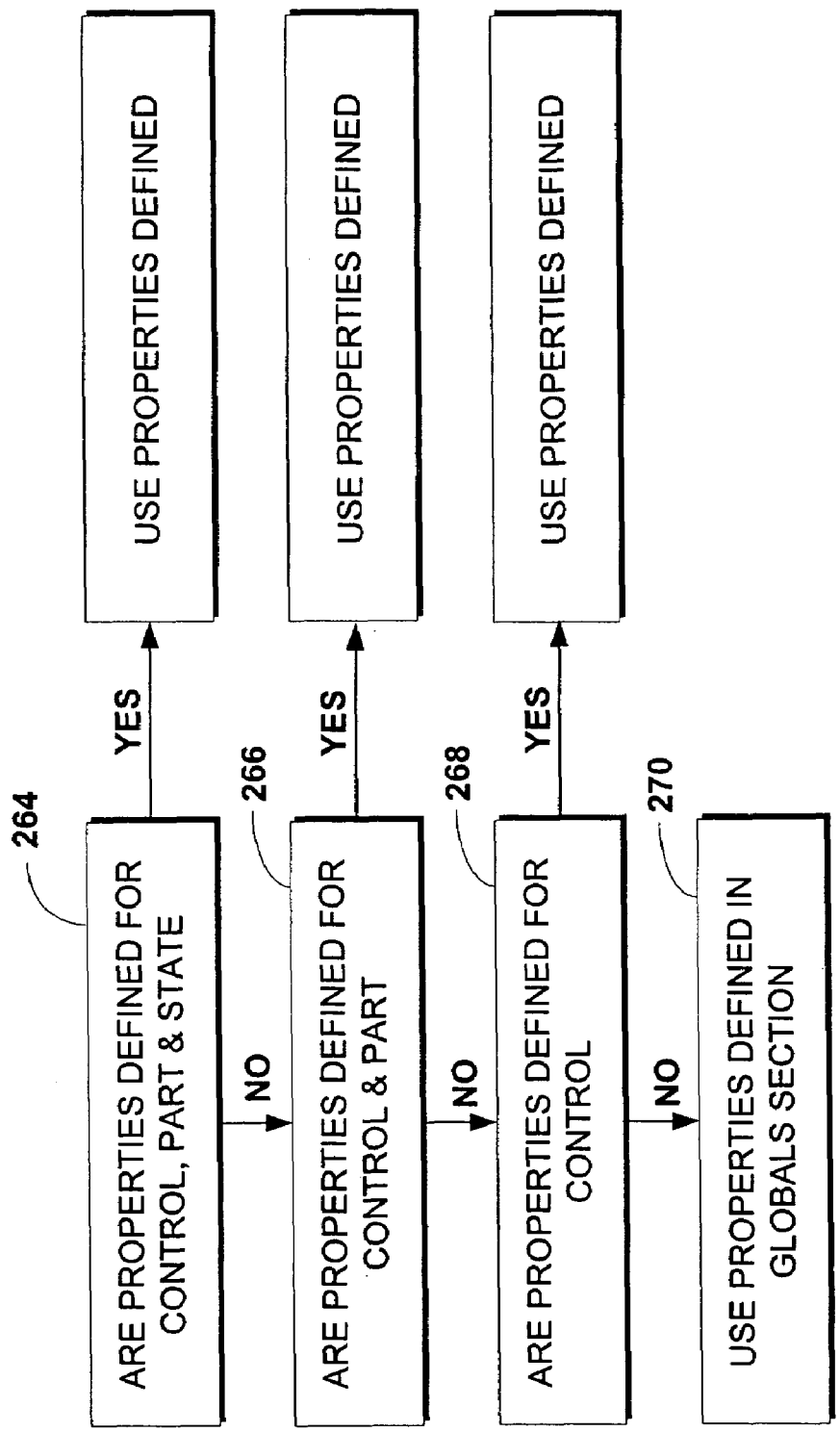
FIG. 5 is a flow chart illustrating the hierarchy in using the properties in the class data file.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 10. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 144 is loaded in RAM 132, the processing unit 120 executes the operating system code and causes the visual elements associated with the user interface of the operating system 134 to be displayed on the monitor 191. When a user opens an application program 135, the program code and relevant data are read from the hard disk drive 141 and stored in RAM 192.

In the present invention, operating system 134 is a graphical operating system having graphically displayed controls and components associated therewith. Controls include, but are not limited to, such things as scroll bars, push buttons and sliders. Other controls are within the scope of this invention, and are known to those of skill in the art. Other graphically displayed components are also within the scope of this invention. These components include, but are in no way limited to, non-client sections of the windows in the display, such as the frame surrounding an application display on the user interface, the minimize box, scrollbars and the close box.

Figure 2:
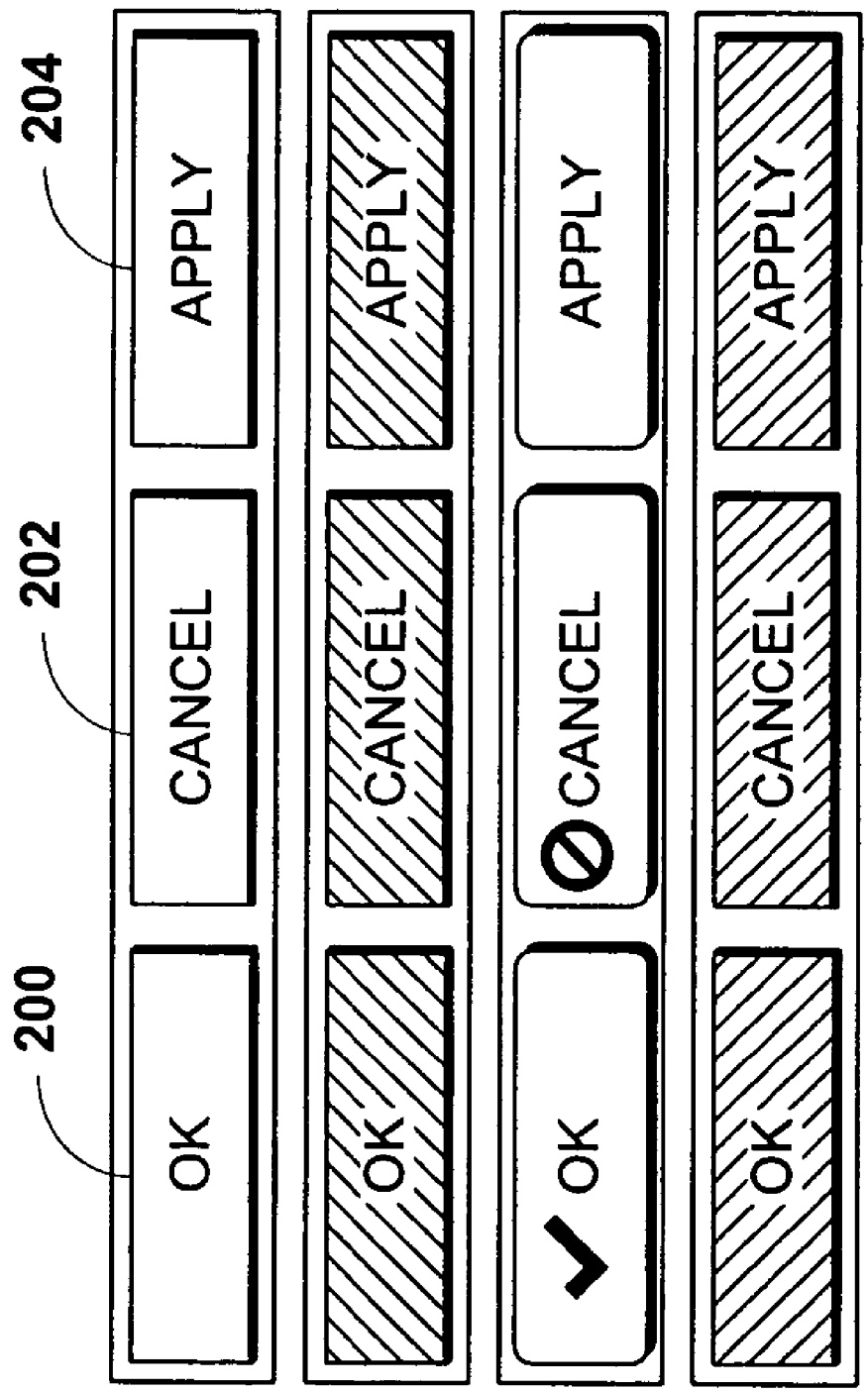
FIG. 2 is a representation of examples of graphical components having different themed appearances.

An example display of graphical components having a variety of appearances is seen in FIG. 2. As shown in FIG. 2, the controls may take the form of an OK button 200, a Cancel button 202 and an Apply button 204. The present invention allows the appearance of the controls and other components to be visually changed to better suit the desire of the computer user. The invention allows the appearance of the controls to be altered beyond color and font selection. For example, the layout of the parts of a control can be defined as desired. For example, a scroll bar could be rendered with the up and down arrow buttons adjacent to each other at the bottom of the scroll bar, instead of the up arrow and the top and the down arrow at the bottom. Further, the shape of the control and its parts may be defined. As shown in FIG. 2, four different overall appearances are shown for each of the buttons 200, 202 and 204. Each different appearance setting is coordinated and is called a "theme." Each theme is represented by one of the rows of buttons in FIG. 2. While only four themes are shown in FIG. 2, an unlimited variety of themes may be created for selection by the computer user. The theme is a collection or set of appearance characteristics relating to a particular subject or desired visual environment. As described below, the present invention allows the user of the computer to specify which of a number of predefined themes is to be applied to the controls and other components of the visual display. Moreover, the present invention allows new visual themes to be added to the system without the need of changing the software code of the controls and other graphical components. Still further, the present invention allows a software designer to compose a themed set of controls and components with a desired look without the need for changing the theme manager code. The invention also allows the visual specification to be done in a hierarchical manner, so that each state of each part of each control can be completely controlled without repeating the values of common properties in every instance, making the file easier for the designer to maintain.

Figure 1:
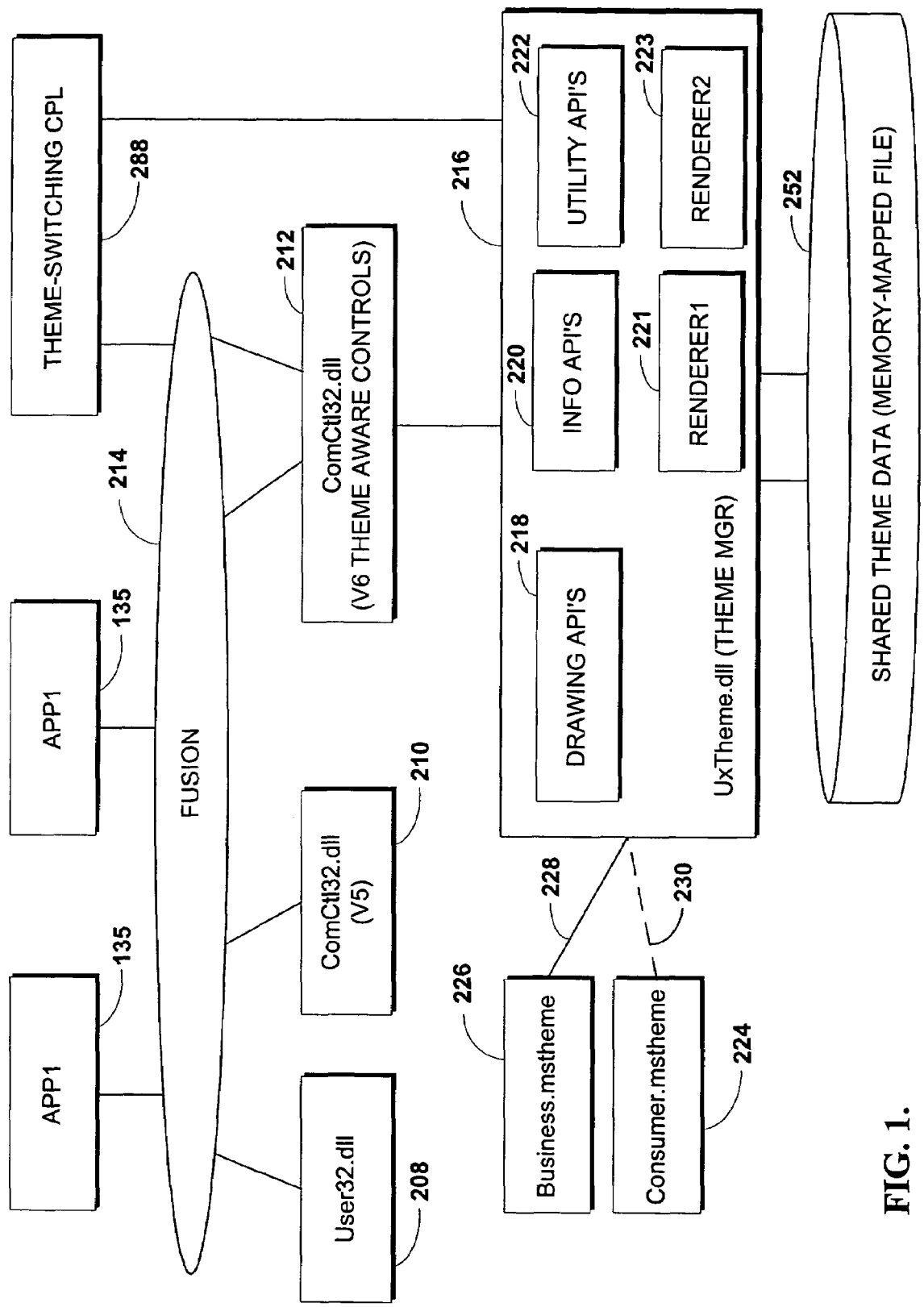
FIG. 1 is a schematic diagram illustrating the architecture used in the present invention.

Turning now to FIG. 1, the basic architecture used in the present invention is illustrated. The architecture is illustrated with example applications 135 that are open and running on the computer 110. As an application 135 is running it often requires a control or graphical component to be rendered, or displayed, on the monitor 191 of the computer 110. For example, with reference to FIG. 2, the display of an OK button 200 may be needed by the application on the monitor.

In the prior art environment, application 135 requests that an instance of button 200 be created. Following this, the operating system transmits a generic message to the control instructing it to draw itself. This request would be routed to the dynamic link library (DLL) that contained the particular control. As an example, the DLL in the WINDOWS operating environment would be called User32.dll or ComCtl32.dll (V5), shown as 208 and 210, respectively, in FIG. 1. Libraries 208 and 210 exist within graphical operating system 134. In the prior art environment, libraries 208 and 210 are linked directly with applications 135. The defined control within libraries 208 and 210 contains the drawing code needed to render the control on the monitor. Therefore, to change the appearance of controls within libraries 208 and 210, the software drawing code must be changed for each control within libraries 208 and 210.

The present invention includes an additional DLL, shown as 212 in FIG. 1. In the WINDOWS operating environment, DLL 212 may be called ComCtl32.dll (V6), as indicated in FIG. 1. This DLL is similar to library 210, in that it contains a number of predefined controls and graphical components that may be used by application 135. Broadly, DLL 212 contains a number of components that are to be graphically displayed. In library 212, however, the controls are defined differently, making them "theme aware." Rather than containing all of the software code needed to render the control, the controls are defined with certain basic information or values about the control, for example, the location, parts and states of the controls.

The location is the position on the user interface where the control is desired. Parts are the different items that make up the control. For example, OK button 200 has a background part and a text part. As another example, a scrollbar control has an elongated rectangular shaft part, a smaller thumb part that slides within the shaft part, and an arrow part at each end of the shaft part. The state of a control describes the current appearance and functional state. For example, a button can be active, pressed, hot (when the mouse is over the control), disabled or inactive.

As stated above, in the prior art environment, libraries 208 and 210 are linked directly with applications 135. In the present invention, libraries 208, 210 and 212 are linked to the applications 135 through a fusion process 214. Fusion 214 enables the theming of controls in applications without needing to change the applications themselves to request the themable version of the controls. Fusion 214 enables each application 135 to load the specific version of the DLL 208, 210 or 212 at run time through the use of a manifest. The fusion manifest specifies the environment in which an application will run, which allows multiples versions of a DLL to exist on one machine. Thus, fusion 214 will map the request for OK button 200 so that it is rendered as a themable element in DLL 212 instead of a non-themable element from DLL 208. This allows an existing application to be themed without changing code of the application. Fusion 214 also allows the new themable controls to be placed in a different DLL from the existing DLL, which simplifies implementation and minimizes compatibility risks.

Controls existing within DLL 212 are therefore used if they are available. As seen above, the controls within DLL 212 are defined as a series of parts and states. The controls within DLL 212 also contain the drawing code needed to render the controls if no themes are selected, as well as the theme-aware paths through the code. DLL 212 requests rendering or drawing services from a theme manager DLL 216. Theme manager 216 provides the requested rendering services and draws the control on the display at the indicated location, with the indicated parts in the indicated states.

Theme manager 216 contains a series of APIs that allow library 212 to interact and communicate with the theme manager. The APIs allow a control author to define a control within DLL 212 as a series of parts and states without the need for software rendering code. These APIs are generally divided into three types: drawing APIs 218, information APIs 220 and utility APIs 222.

Drawing APIs 218 are generally used to render and assist in the layout of the needed control parts and other components. Drawing APIs 218 are thus a collection of theme-aware drawing services. Each individual API within the set of drawing APIs 218 is used to perform a different drawing service. Generally, each API requires a specified part and state of the graphical component at hand.

Information APIs 220 are generally used to obtain information about the current defined appearance of the controls to allow controls to be individually customized. These information APIs 220 allow controls to be individually customized. In other words, these APIs are utilized in only certain instances and may be used to obtain information about specific controls. These information APIs are used to query theme manager 216 for defined theme information regarding specified properties of the theme. Each API 220 thus requests information, which is provided by theme manager 216. Utility APIs 222 are those APIs used by parts of the operating system other than the controls, to control theme selection. Utility APIs 222 include functions that can be used to enumerate an installed theme and load it.

As an example, if an OK button 200 was requested by an application 135, the control within DLL 212 would pass the part, state and location information to drawing APIs 218 through a function call, such as DrawThemeBackground, or DrawThemeText. As is more fully described below, this part and state information is matched with appearance characteristics and theme manager 216 draws the control on the user interface.

Drawing APIs 218 and information APIs 220 allow the author or creator of controls within DLL 212 to define the controls as a series of parts and states. The defined control is therefore abstracted from the rendering process of theme manager 216 and is also abstracted from the theme-defined appearance information or characteristics. Using APIs 218 and 220 the control author can create controls that are "theme-aware" and that are equipped to communicate with theme manager 216. This communication involves passing basic information or values to theme manager 216 that allow the theme manager to render the desired control, having the needed parts in the desired states.

Theme manager 216 also contains the renderers needed to execute the drawing instructions. For example, a border-fill renderer 221 could be used that allows different color themes to be applied to the controls. As another example, a bitmap renderer 223 could be used that defines the control parts as images. Other examples of renderers include using a vector definition language, portable network graphics (PNG) files, or portable document format files (PDF). It should be understood that the present invention is not limited to a particular rendering technology. If a different renderer is desired or needed, the drawing code of theme manager 216 is revised to add the renderer to theme manager 216. The controls within DLL 212 are therefore isolated or abstracted from the rendering technology within theme manager 216.

The renderer within theme manager 216 renders the requested control according to an appearance theme that has been selected by the user of the computer. For example, appearance themes 224 and 226 are shown in FIG. 1. As shown, theme 224 may be a consumer theme and theme 226 may be a business theme. It should be understood, however, that other themes could be used and that the invention is in no way limited to the particular theme. For example, other themes could include a cartoon theme, a children's theme or a golf theme. As seen in FIG. 1, business theme 226 has been selected by the user, as represented by the solid line 228. Consumer theme 224 is available for selection, as represented by the broken line 230.

Figure 3:
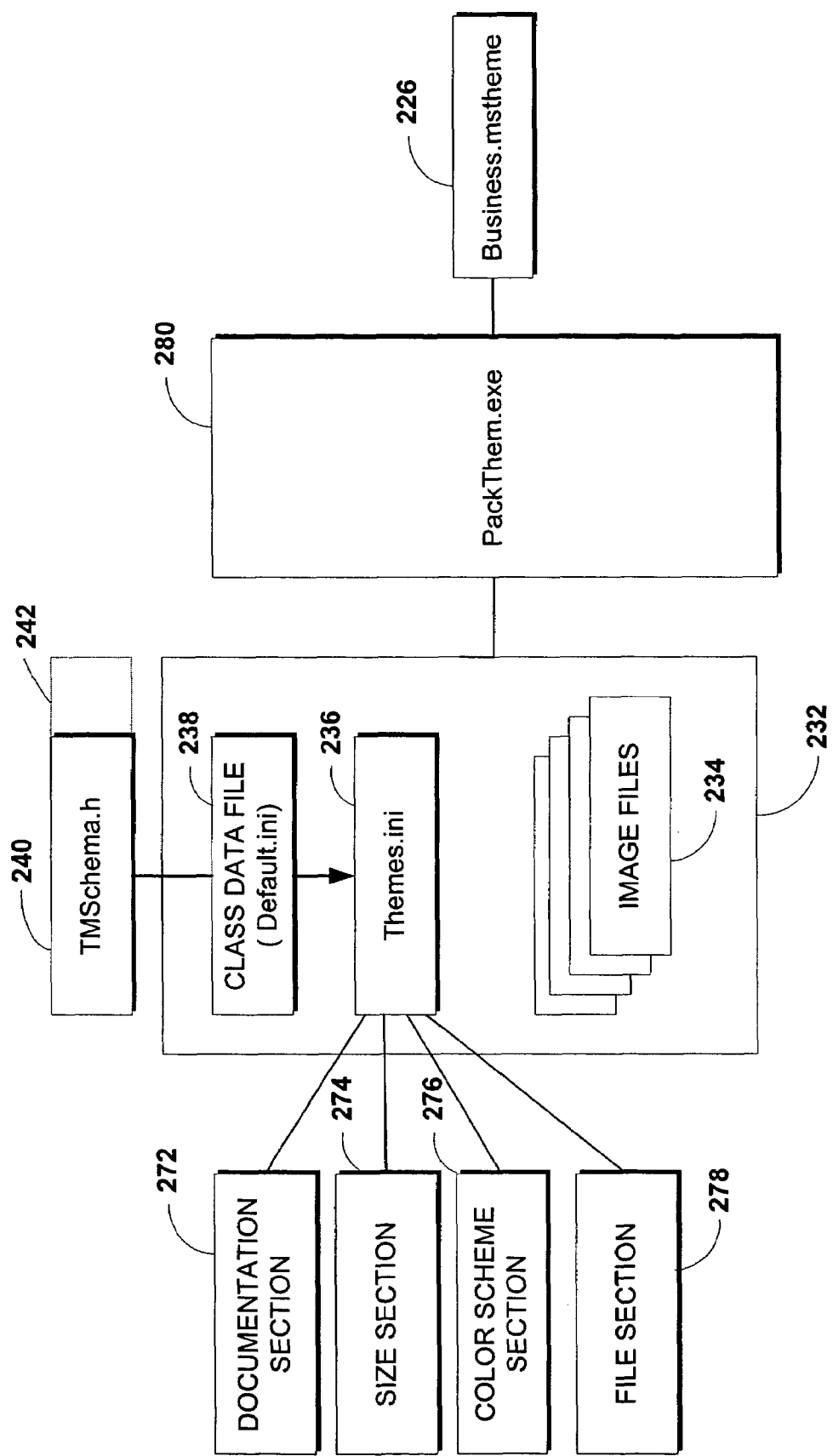
FIG. 3 is a schematic diagram illustrating the architecture of a theme file.

Each theme 224 and 226 has similar architecture. As seen in FIG. 3, a theme directory 232 is included with business theme 226. Directory 232 includes a series of image files 234. Image files 234 are the image files that will be used by the particular theme. In this case, image files 234 are the image files that will be used by business theme 226. Business theme 226 also includes a themes.ini file 236. File 236 is a text file and can be created in either ANSI or UNICODE character sets. File 236 specifies the available color schemes and sizes available for the theme. In the case of theme 226, file 236 specifies the available color schemes and sizes available for business theme 226. File 236 therefore represents all of the variations of the theme to which it applies, as is more fully described below.

File 236 is a directory of available class data files 238. In other words, the class data files 238 are packaged into file 236, as is described below. Class data files 238 are also .ini files as shown by the label "Default.ini." Class data files are used to list the theme data for a specific size and color. Each class data file is created by the theme author or designer from a schema file 240, labeled TMSchema.h in FIG. 3. Schema file 240 defines the controls, parts, states and available properties. Schema file 240 defines the properties that are recognized by the theme manager and gives them a unique identifier so they can be shared between the theme manager 216 and the control code at runtime. Schema file 240 is thus the defining vocabulary of available options that may be placed in a class data file 238. However, file 240 is extensible, as represented by the added material 242 in FIG. 3. When a theme-aware custom control is registered, its schema information is queried at theme parse time or load time and combined with the main schema information. This allows the theme properties of the control to appear in the main classdata file or in one registered with the custom control itself. It should be understood that the invention could be used with other schema approaches, such as a hardcoded list of controls and their parts.

As an example of the type of information within schema file 240, information about the button control may be present. For example, the following may be contained within the schema file 240:

"Button" parts and states:
Pushbutton=Up, Pushed, Disabled, Hot, Default
Radiobutton=Unchecked(1), Checked, UncheckedDown, CheckedDown
CheckBox=Unchecked(1), Checked, UncheckedDown, CheckedDown
GroupBox
UserButton.

This information informs the theme author of the available controls and the defined parts and states for those controls. This information, along with available properties for the controls, parts and states, informs the theme author as to what is available for composing class data file 238. When a theme-aware custom control is registered, its schema information is queried at theme parse time or load time and combined with the main schema information. This allows the theme properties of the control to appear in the main classdata file or in one registered with the custom control itself. Thus, schema file 240 and any mini-schema files 242 are basically master definition files that allow the theme author to create a defined theme appearance.

Figure 4:
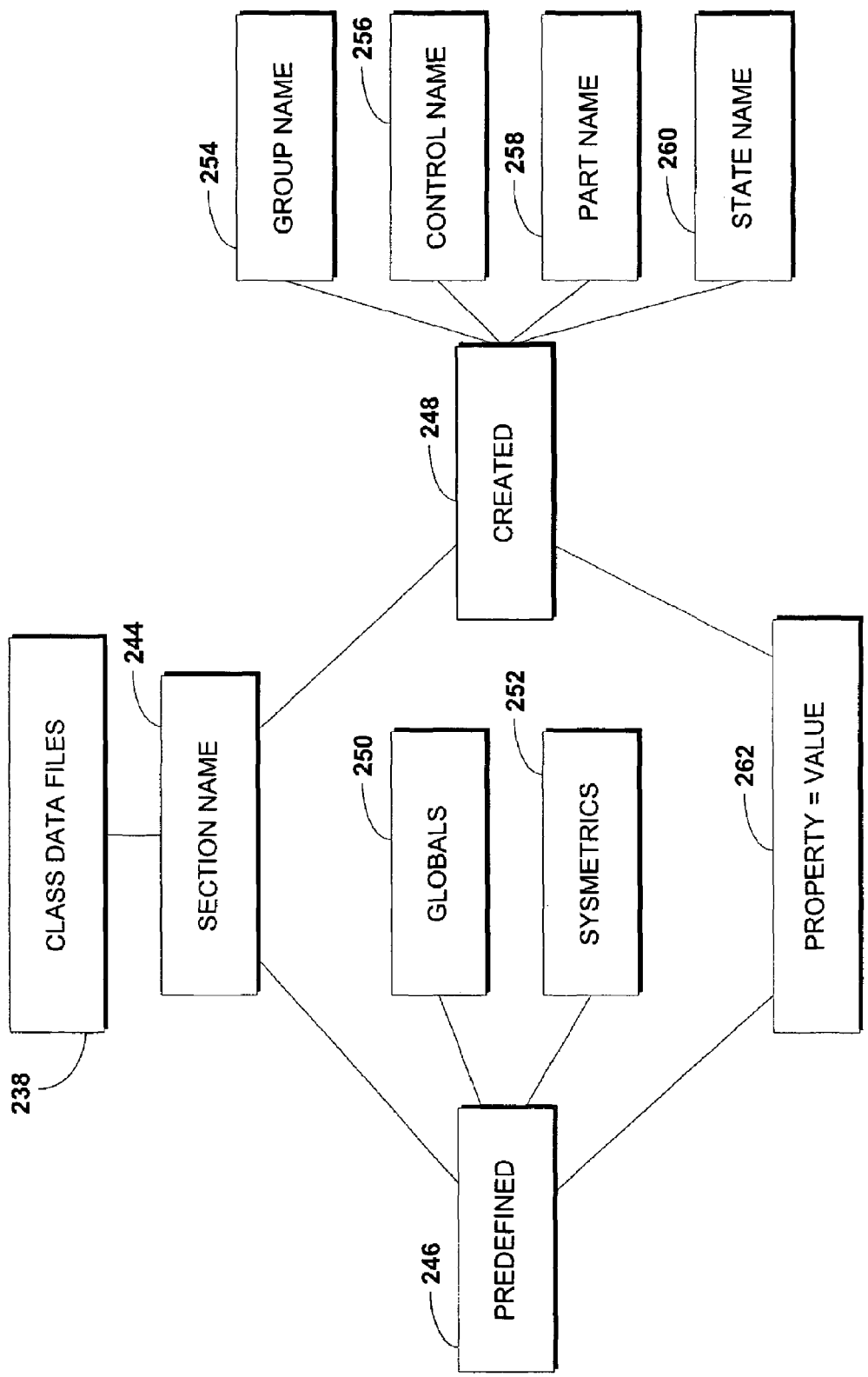
FIG. 4 is a schematic diagram illustrating the architecture of a class data file.

As best seen in FIG. 4 each class data file 238 has a specific file format that allows each class data file 238 to be easily and uniformly created. File 238 may contain defining sections 244, which may be either predefined sections 246 or created sections 248. Typical predefined sections 246 include a globals section 250 that is a list of property name settings that are inherited by each parent class section. If used, the globals section 250 must be the first section. The globals values will be overridden by more specific, created properties if they are present, as is more fully described below.

Another predefined section that may be specified is called "Sysmetrics," and is labeled 252 in FIG. 4. Sysmetrics section 252 allows the theme author to set the system metrics when the theme is loaded so that the look of non-themed applications can be made to more closely match the look of the theme. The Sysmetrics section 252 is therefore available to legacy applications that are not "theme aware." When a theme is created, the theme author can set system metrics values to appear as close to the theme as possible. System metrics such as the colors for controls and nonclient components, fonts, sizes, booleans and strings can be set using the Sysmetrics sections 252.

Created sections 248 are also referred to as class sections. Each class section can have an optional group name 254, a control name 256, an optional part name 258 and an optional state name 260. The group name 254 is the base name of an application, such as "MICROSOFT MONEY." If the group name is specified, then the properties specified will be applied only to that application. The control name 256 is simply the class name as defined by the control author. For example, the control name might be "button." The part name 258 is the child part name. For example, a part name for a button might be "pushbutton." The child part name 258 must be defined as a part name for the control name 256 in the TMSchema.h file 240. Finally, the state name 260 is the state that the part might be in. For example, a state name 260 for the pushbutton part might be "up." The state name 260 must be defined as a state name for its part 258 in the TMSchema.h file 240. In order to logically separate each of the above, the group name 254 is followed by ::, a period is placed between the control name 256 and the part name 258 and the state is placed in parentheses. As an example, a theme author may specify [MICROSOFT MONEY::button.pushbutton(up)]. The properties defined using this specification would apply only to the up state of the pushbutton part of the button in MICROSOFT MONEY applications. For both the predefined sections 246 and the created sections 248 properties are specified along with a corresponding value, as indicated at 262 in FIG. 4. The following table represents the basic property types and the corresponding value formats:

| PROPERTY TYPE | VALUE FORMAT |
| --- | --- |
| String | Any text to the right of the "=" with no quotes. |
| Int | A signed integer or hex number |
| Bool | On of the values: "true" or "false." |
| Color | A space separated list of three numbers, corresponding to red, green and blue. |
| Enum | A string value that gets matched to a declared enum. |
| Margins | A comma separated list of four integers, with partnames "lw", "rw", "th" and "bh". |
| Filename | A relative path that gets fully qualified. |
| Size | An integer followed by optional "twips," "pixels," or "points." |
| Position | A comma separated list of two integers with partnames "x" and "y." |
| Rect | A comma separated list of four integers with partnames "l", "t", "r", and "b". |
| Font | Family name, size and font flags. |

Each of the group name, control name, part name and state name behave in a hierarchical fashion. State names 260 inherit from their part name 258 or control name 256 and part names 258 inherit from their control names 256. The group name 254, control name 256, part name 258 and state name 260 contain, together with the inherited globals section 250, all of the property values needed to render the specified class of control. This hierarchy can best be seen in FIG. 5. As indicated at 264, it is first determined if properties are defined for the control, part and state. If so, they will be used. Similarly, it is next determined if properties are defined for the control and part, as indicated at 266. If so, the defined properties will be used. If not, it is then determined whether properties are defined for the control, as shown at 268. If so, the defined properties will be used. If not, the properties defined in the globals section 250 will be used, as indicated at 270.

The above file format for the class data files 238, along with the available vocabulary as defined in the schema file 240 can be used by the theme author to create a variety of class data files 238 without the need to go through a series of iterations with a programmer. As an example, a theme author may draft the following:

[Button]
    Font=Arial, 14, Bold
    ImageFile=bluebutton.bmp
[Button.Pushbutton]
    TextColor=255, 0, 0
    Font=Arial, 15

In this example, the properties defined for all buttons are "font" and "ImageFile". The pushbutton part of the button overrides the "font" property with its own value, adds a new "TextColor" property, and inherits the "ImageFile" property from button. The defined properties for the button class will be applied to all buttons, but the specified properties for the pushbutton part will prevail over the specified properties for the button class.

Theme file 236, the "package" file, also consists of one or more sections. The sections within theme file 236 include a documentation section 272, a size section 274, a color scheme section 276 and a file section 278. Documentation section 272 is optional and may contain any property name. For example, documentation section may specify a name for the theme to be displayed on the user interface, such as "business theme." Size section 274 specifies the size names available, such as "default size," "very small" or "very large."

Color scheme section 276 is used to specify a simple color scheme name and an optional color scheme transformation associated with the color scheme name. For example, if only one color scheme is available, the color scheme name would likely be "default color." Other color scheme names could be made available, as described below, and would be named as well. For example, a blue color scheme and a red color scheme could be listed in color scheme section. If a particular desired color scheme has not been created as a class data file, as more fully described below, the theme author can perform a color scheme transformation on an existing theme file. In the color scheme section, the theme author can transform an existing color scheme through use of "From Color=" and "To Color=" commands along with available "From Hue=" and "To Hue=" commands. The values specified after the "=" sign are values for red, green and blue, respectively. For example, if the theme author desired to change any color that is red to green and to change the hue of the color scheme, the theme author may specify in the color scheme section 276:

From Color1=255 0 0
    To Color1=0 255 0
    From Hue=128
    To Hue=75.

A number of these transformations are supported. For example, five such transformations may be supported. These color transformations operate on explicit color values within the class file being transformed, as well as on the image files specified in the class file. This transformation process allows the theme author to generate a large number of available colors from a single class data file.

The size section 274 can operate similarly to color scheme section 276 as described above. As such, a size name can be associated with a specific class data file. Additionally, size transformations can be performed on a specified class data file in a manner like that described above for the color transformations.

File section 278 is used to specify a unique name for each of the class data files 238. Each class data file listed in the file section 278 will include the file name, a color scheme (from color scheme section 276, including transformations) for that file name, and the sizes (from the size section 274) that the file will support. File section 278 is therefore a list of all possible colors and sizes available, including color transformations. The file section 278 is named "file.xxx" where "xxx" is replaced with a unique name for the class data file. The file section 278 recognizes properties for a filename, color schemes and sizes. An example file section for the class data file named "One" would be:

[File.One]
    Filename=Large.ini
    Colorschemes=default, blue, red
    Sizes=Large In this example, file section 278 corresponds to the Large class data file and supports the color schemes default, blue and red. The only size that the file supports is "Large."

Image files 234, theme file 236 (including packaged class data files 238) are broadly grouped together to make up theme directory 232. Theme directory 232 and the schema file 240 are used to build the business theme file 226. The mini-schemas 242 are header files compiled into the custom control code, usually a .dll file. The mini-schemas 242 are not accessed until theme parse or load time, but are merged with the tmschema.h information in memory. Theme directory 232 thus contains a theme.ini file 236, one or more class data files 238 and all of the image files 232 used by the theme. The contents of theme directory 232 can be packaged into a DLL file by packthem tool 280. Packthem tool 280 processes the Themes.ini file 236 by parsing it against the schema file 240 for syntax errors and adding the .ini file to the package being built. Recognized properties from documentation section 272 are written to a package string table. Color scheme information from color scheme section 276 and size information from size section 274 is also written to a package string table. Each class data file 238 is also processed. As the class data file is processed, the file is parsed against the schema file 240 for syntax errors. Each class data file is also added to the package being built.

The DLL file produced by packthem tool 280 is business theme file 226. File 226 contains the theme data and this theme data is isolated from control library 212. This allows different themes to be created and selected without changing the controls defined within library 212. Thus, control authors can create and define controls independently of the appearance or theme data. File 226 is in binary format and is passed into a shared theme data file 252 when business theme 226 is selected by the computer user, as best seen in FIG. 1. File 252 is a shared memory map file that can be accessed by all processes. Thus, when a theme is selected by the computer user, theme manager 216 will read the information for a defined theme file, such as file 226, and will place that information in a binary format in file 252 where all running processes have access to the binary information.

Figure 6:
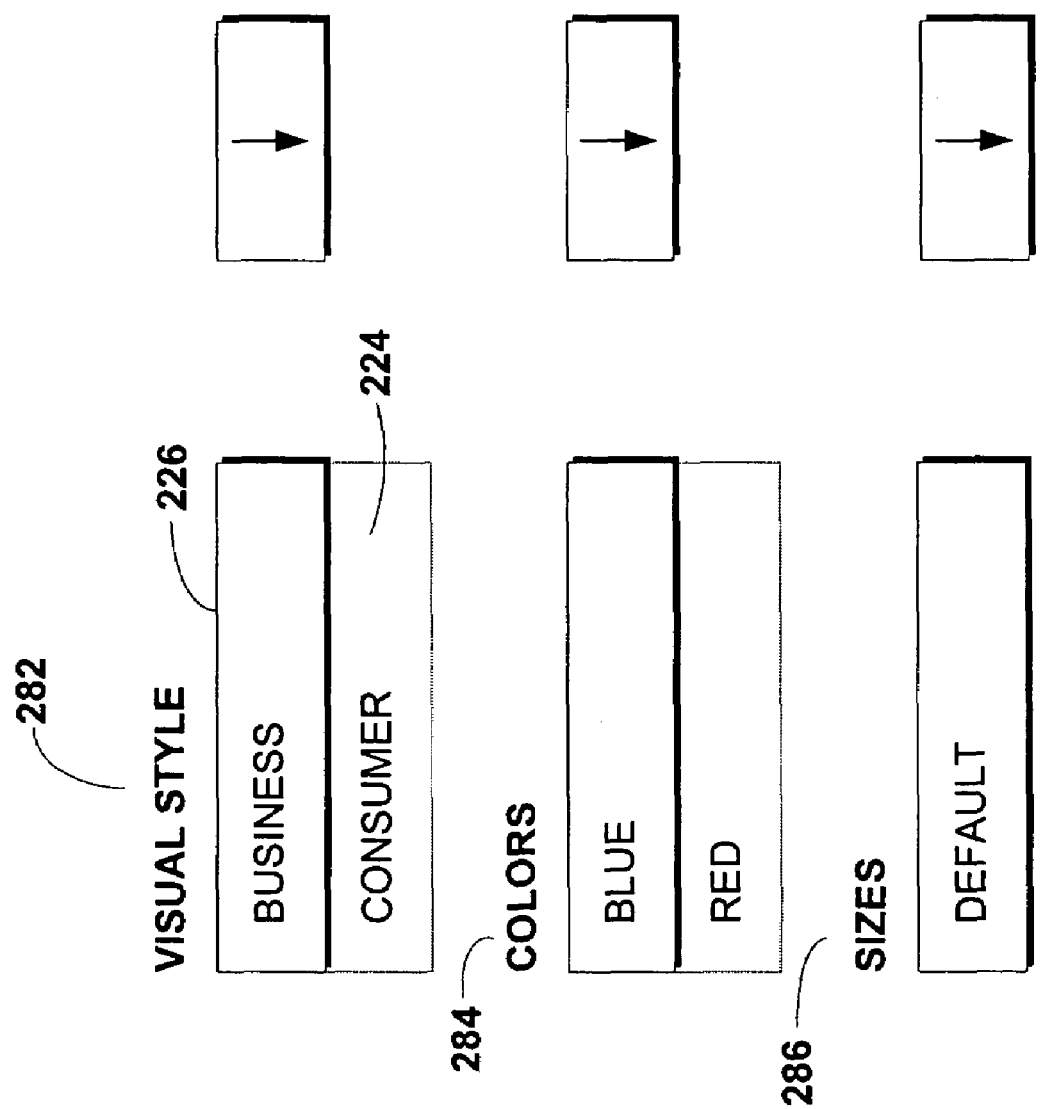
FIG. 6 is a schematic view of a user interface having drop-down menus.

As best seen in FIG. 1, a theme-switching control panel 288 is provided that is in communication with theme manager 216. Panel 288 cooperates with a user interface that displays the available themes from which the user can select. As shown in FIG. 1, control panel 288 would allow a user to select business theme 226 or consumer theme 224. The user would also be presented with available options created by the theme author within each of the class data files. For example, as is best seen in FIG. 6, the user interface may present a series of drop down menus corresponding to the visual style 282, the available color scheme 284 for that visual style and the available sizes 286 for that visual style. In the example seen in FIG. 6, the user can see that the business theme 226 is selected, but that consumer style 224 is available. For the selected business theme 226, the user can see that the theme author has created two color schemes, displayed as "BLUE" and "RED." Finally, the user can see that the only size the theme author has made available is the default size.

If as has been discussed above, business theme 226 is selected and the user of the computer switches to select consumer theme 224, theme 224 will be loaded into shared memory map file 252 as binary data. Theme manager 216 also sends a message to each theme-aware control within DLL file 212 that the theme has changed. Each theme-aware control knows how to respond to this message.

Alternative embodiments of the present invention will become apparent to those skilled in the art to which it pertains upon review of the specification, including the drawing figures. Accordingly, the appended claims rather than the foregoing description define the scope of the present invention.

We claim:

1. A method of creating a visual style for a set of graphical components for use on a computer system having a graphical operating environment, comprising:
   providing a schema file of available graphical components for which a visual style can be created, the visual style comprising a layout or shape of the graphical components and associated parts,
   wherein each of the graphical components includes two or more associated parts that form the graphical component,
   wherein the graphical components are controls that perform an associated known operation when selected by a user,
   wherein the layout of the graphical components and the associated parts comprises one or more of a size or a position on a display device,
   wherein each graphical component is defined by a unique class name, and
   wherein each class includes at least one part identified by a part name and each part includes at least one state such that each graphical component is identified by at least a corresponding class name and a corresponding part name;
   receiving a selection of one of the graphical components within a specified unique class and having a specified part name and a specified state from said schema file of graphical components, that are desired to have a defined visual style;
   assigning properties to said selected graphical component according to said defined visual style; and
   grouping pairs of selected graphical components and corresponding assigned properties for the defined visual style together in a class data file.

2. The method of claim 1, wherein each graphical component defined within the schema file of graphical components has a state name associated with each defined state.

3. The method of claim 1, further comprising providing a list of available properties, within the schema file of graphical components, that may be selected in said selecting step for each defined graphical component, part and state.

4. The method of claim 1, further comprising the step of adding to the schema file by providing a second schema file of available graphical components for which a visual style can be created, each component within said second file being defined by a unique class name, the graphical components of said second file being defined differently than the graphical components of said first file.

5. The method of claim 4, further comprising the step of packaging all defined class data files into a directory for selection by a user of a computer.

6. The method of claim 1, further comprising creating a plurality of class data files, each corresponding to a defined visual style.

7. The method of claim 6, wherein the class data files have both a predefined section of components in addition to the selected section of components of said paired graphical components and property values.

8. The method of claim 7, wherein said predefined section of components includes a global section and a system metrics section.

9. The method of claim 8, wherein said selected section of components is adapted to define a group name, a class control name, a part name and a state name.

10. The method of claim 9, wherein said group name, said class control name, said part name and said state name are defined in a hierarchical fashion so that properties are used in order of said state name, said part name, said class control name and said group name.

11. A method of creating a visual style for a set of graphical components for use on a computer system having a graphical operating environment, comprising:
    selecting a number of graphical components that are desired to have a defined visual style such that the number of graphical components are selected from a schema file that stores each graphical component in a class identified by a unique class name,
    wherein each class includes at least one part having a part name for identifying the graphical component and each part includes at least one state,
    wherein the graphical components are controls that perform an associated known operation when selected by a user,
    wherein the at least one state describes a current appearance and a functional state of the graphical component, and
    wherein the visual style comprises a layout and shape of the graphical components and associated parts, the layout of the graphical components and the associated parts comprising one or more of a size or a position on a display device;
    assigning properties to said selected graphical components according to said defined visual style; and
    grouping pairs of selected graphical components and corresponding assigned properties for the defined visual style together in a first class data file,
    wherein the first class data file contains data on the defined visual style.

12. The method of claim 11, wherein the graphical components are defined within a schema file of available graphical components, each component being defined by a unique class name and one or more part names associated with the class name.

13. The method of claim 12, wherein the graphical components defined within the schema file of graphical components have a state name associated with each defined state.

14. The method of claim 11, further comprising providing a list of available properties that may be selected in said selecting step for each defined graphical component.

15. The method of claim 14, further comprising creating a plurality of class data files, each corresponding to a defined visual style.

16. The method of claim 15, further comprising the step of packaging all defined class data files into a directory for selection by a user of the computer.

17. The method of claim 11, further comprising creating a second class data file, relating to a different size visual style, from the first class data file using a property size transformation.

18. The method of claim 11, further comprising creating a second class data file, relating to a different color visual style, from the first class data file using a property color transformation.

19. The method of claim 11, wherein said properties are defined in a hierarchical fashion, according to a group name, a class control name, a part name and a state name, so that properties are used in order of said state name, said part name, said class control name and said group name.

* * * * *